(12) United States Patent
Marche

(10) Patent No.: US 8,091,832 B2
(45) Date of Patent: Jan. 10, 2012

(54) NACELLE COWLING FOR TURBOJET AND NACELLE COMPRISING AT LEAST ONE SUCH COWLING

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 694 days.

(21) Appl. No.: 12/065,629

(22) PCT Filed: Aug. 17, 2006

(86) PCT No.: PCT/FR2006/050804
§ 371 (c)(1),
(2), (4) Date: Jul. 14, 2008

(87) PCT Pub. No.: WO2007/028916
PCT Pub. Date: Mar. 15, 2007

(65) Prior Publication Data
US 2008/0277529 A1    Nov. 13, 2008

(30) Foreign Application Priority Data
Sep. 8, 2005    (FR) ...................................... 05 52717

(51) Int. Cl.
*B64C 1/14*    (2006.01)
(52) U.S. Cl. ................................... 244/129.5; 244/53 B
(58) Field of Classification Search ............... 244/129.5, 244/53 B, 129.4, 53 R; 49/379
See application file for complete search history.

(56) References Cited

U.S. PATENT DOCUMENTS

| | | | |
|---|---|---|---|
| 2,335,090 A * | 11/1943 | Swiech | 244/129.5 |
| 3,333,772 A | 8/1967 | Brunner | |
| 3,493,178 A | 2/1970 | Brunner | |
| 5,035,379 A | 7/1991 | Hersen et al. | |
| 5,673,874 A | 10/1997 | Howard | |
| 5,678,787 A * | 10/1997 | Kahn et al. | 244/129.5 |
| 6,179,249 B1 | 1/2001 | Canadas | |
| 6,220,546 B1 * | 4/2001 | Klamka et al. | 244/129.4 |
| 6,227,485 B1 * | 5/2001 | Porte | 244/54 |
| 6,334,730 B1 * | 1/2002 | Porte | 403/104 |
| 7,789,347 B2 * | 9/2010 | Oberle et al. | 244/129.4 |

FOREIGN PATENT DOCUMENTS
GB    2403774 A    1/2005

OTHER PUBLICATIONS
Chinese Office Action dated Apr. 10, 2009.
* cited by examiner

*Primary Examiner* — Christopher P Ellis
(74) *Attorney, Agent, or Firm* — Perman & Green, LLP

(57) ABSTRACT

A nacelle cowling for a turbojet, characterized in that it is provided with a fixed part and a mobile part, the mobile part being adapted to slide along the fixed part, from a closed position wherein the mobile part extends in the extension of the fixed part, up to an open position wherein the mobile part is at least partly superimposed to the fixed part. For example, the fixed part is located in the upper part of the cowling, the mobile part being located in the lower part of the cowling.

8 Claims, 2 Drawing Sheets

NACELLE COWLING FOR TURBOJET AND NACELLE COMPRISING AT LEAST ONE SUCH COWLING

CROSS REFERENCE TO RELATED APPLICATIONS

This application is the International Application No. PCT/FR2006/050804, International Filing Date, 17 Aug. 2006, which designated the United States of America, and which International Application was published under PCT Article 21 (2) as WO publication No. WO2007/028916 and which claims priority from French Application No. 0552717, filed on 8 Sep. 2005, the disclosures of which are incorporated herein by reference in their entireties.

BACKGROUND

Field

The disclosed embodiments relate to a nacelle cowling for an aircraft turbojet engine. More specifically, the disclosed embodiments relate to a nacelle cowling able to have at least one closed position in which the cowling completely covers a turbojet engine housed in the nacelle, and an open position in which the cowling is away from the turbojet, so as to allow access to said turbojet.

SUMMARY

The nacelle of an aircraft turbojet engine generally comprises two cowlings, these being a right-hand cowling and a left-hand cowling respectively, and positioned one on each side of the fan of the turbojet. Each cowling has a cross section in the shape of an arc of a circle in a plane transverse to the nacelle, around a semicircular external contour of a right side and a left side of the turbojet engine.

In general, at least one of the two cowlings of the nacelle can be opened so as to allow access to the various equipment and systems housed within the nacelle. To do that, the upper edge of the cowling is articulated to the upper part of the turbojet engine. For example, the upper edge of the cowling is rotationally mounted on the upper part of the turbojet engine so as to allow said cowling to be pivoted from a lowered position in which it follows the external contour of one side of the turbojet engine into a raised position in which it is raised up with respect to the turbojet engine. Such upward pivoting opens access to the interior of the nacelle allowing maintenance to be carried out on the turbojet. When the airplane is in flight, the cowlings are closed and have a shape such that they provide the nacelle in its entirety with aerodynamic continuity.

In order to secure the cowling closed, the lower edge of said cowling is equipped with a locking system allowing the cowling to be kept in the closed position at the end of the maintenance session and more specifically during flight. A locking mechanism such as this is necessary to prevent unwanted opening of the cowling or cowlings during flight. Specifically, when the aircraft is in flight there are a number of factors, such as the aerodynamic flow over the cowlings, any raised pressures caused by the bursting of pipework internal to the engine or alternatively the presence of ventilation devices, that exert forces on the cowlings that tend to open these. When a cowling opens in mid-flight it is easily torn off the nacelle. This is something that may occur particularly when the ground crew have forgotten to fasten one or more of the latches of the locking system. The turbojet engine is then no longer protected and the cowling is obliterated on the ground uncontrollably.

Since present-day opening cowlings are not entirely satisfactory insofar as, as a result of human error, said cowlings may open and/or be torn off the nacelle.

The disclosed embodiments seek to solve the above-mentioned problem by proposing a nacelle cowling that can have a closed position and an open position but that does not run the risk of opening unwontedly when an aircraft fitted with said nacelle is in flight.

To do that, the disclosed embodiments propose to equip a turbojet nacelle with at least one removable cowling formed of two independent parts capable of sliding one relative to the other so as to open access to the interior of the nacelle. More specifically, a first part of the cowling is fixed with respect to the remainder of the nacelle and with respect to the turbojet engine, while the second part is capable of a translational movement along the first part in order to open access to an opening. Depending on the requirement, it is possible to anticipate several degrees of openness of the cowling, with the moving part superposed to greater or lesser extents on the fixed part. The greater the extent to which the moving part is superposed on the fixed part, the larger the opening, and vice versa.

As a preference, the fixed part and the moving part of the cowling according to the disclosed embodiments are formed in the height of said cowling. The term height is to be understood to mean the dimension of the cowling extending vertically with respect to the axis of the turbojet. Thus, during flight, the thrust exerted on the turbojet nacelle by an external airflow does not run the risk of accidentally opening the removable cowling or cowlings of said nacelle, which is something that could occur were the fixed and moving parts of the cowling to run in the direction of the length of said cowling. The term length is to be understood to mean the dimension of the cowling running parallel to the axis of the turbojet.

Insofar as most of the time the various systems and accessories that need to be accessed in the turbojet engine lie in the lower part of the turbojet, it may be advantageous to form the moving part of the cowling near the lower part of the nacelle and the fixed part near the upper part. The lower part or bottom part is to be understood to mean, in general, that part of the relevant element that lies below the axis of the turbojet engine housed in the nacelle. The upper part or top part is to be understood as meaning, in general, that part of the relevant element that lies above the axis of the turbojet engine housed in the nacelle.

The moving part can slide, with respect to the fixed part, in the manner of a roller shutter. For example, the moving part slides inside the nacelle, which makes it possible not to create any aerodynamic drag, or to create very little drag. This is because the sliding means are formed on an internal part of the nacelle cowling and therefore do not disturb the aerodynamic flow over the outside of the nacelle.

To make it easier to open and close the cowling according to the disclosed embodiments it is possible to provide one or more handles positioned on the external face of the moving part of the cowling and allowing said moving part to be grasped by hand and raised or lowered easily.

The disclosed embodiments also provide a locking system that will allow the cowling according to the disclosed embodiments to be kept, on the one hand, in the closed position when the aircraft is in flight and, on the other hand, in the open position when nacelle maintenance is to be carried out. This then prevents the nacelle cowling from closing itself unwontedly by sliding into the closed position while somebody is in the process of carrying out maintenance. Furthermore, a dual-purpose system such as this saves space and mass in the nacelle. The term "dual-purpose" is intended to mean something capable of performing two different and independent functions.

A subject of the disclosed embodiments are therefore a nacelle cowling for a turbojet, characterized in that it is equipped with a fixed part and a moving part extending one above the other, the moving part being able to slide along the fixed part from a closed position in which the moving part runs in the continuation of the fixed part to an open position in which the moving part is at least partially superposed on the fixed part.

According to some exemplary embodiments of the nacelle cowling according to the disclosed embodiments, it is possible to add all or some of the following additional features:

the fixed part lies in the upper part of the cowling, the moving part lying in the lower part of said cowling;

the moving part comprises engagement means capable of engaging in guide rails that guide the sliding, it being possible for said guide rails to be fixably mounted in the nacelle;

the moving part of the cowling slides along an internal face of the fixed part of said cowling;

the moving part is equipped with at least one upper handle situated at the upper part of the moving part and with at least one lower handle situated in the lower part of the moving part;

at least one upper and/or lower handle is retractable;

the cowling comprises a locking device capable of locking the moving part of the cowling in the closed and/or open position;

the locking device comprises pins situated on an internal face of the moving part of the cowling, said pins being intended to be inserted in orifices made on fixed members of the nacelle;

the locking device is actuated by at least one handle situated on the moving part of the cowling.

The disclosed embodiments also relate to a nacelle equipped with at least one cowling according to the disclosed embodiments. As a preference, the two cowlings of the nacelle are cowlings according to the disclosed embodiments.

The disclosed embodiments will be better understood from reading the description which follows and from examining the accompanying figures. These are given by way of entirely nonlimiting indication of the disclosed embodiments. The figures depict:

DETAILED DESCRIPTION OF THE DRAWINGS

Figure 1:
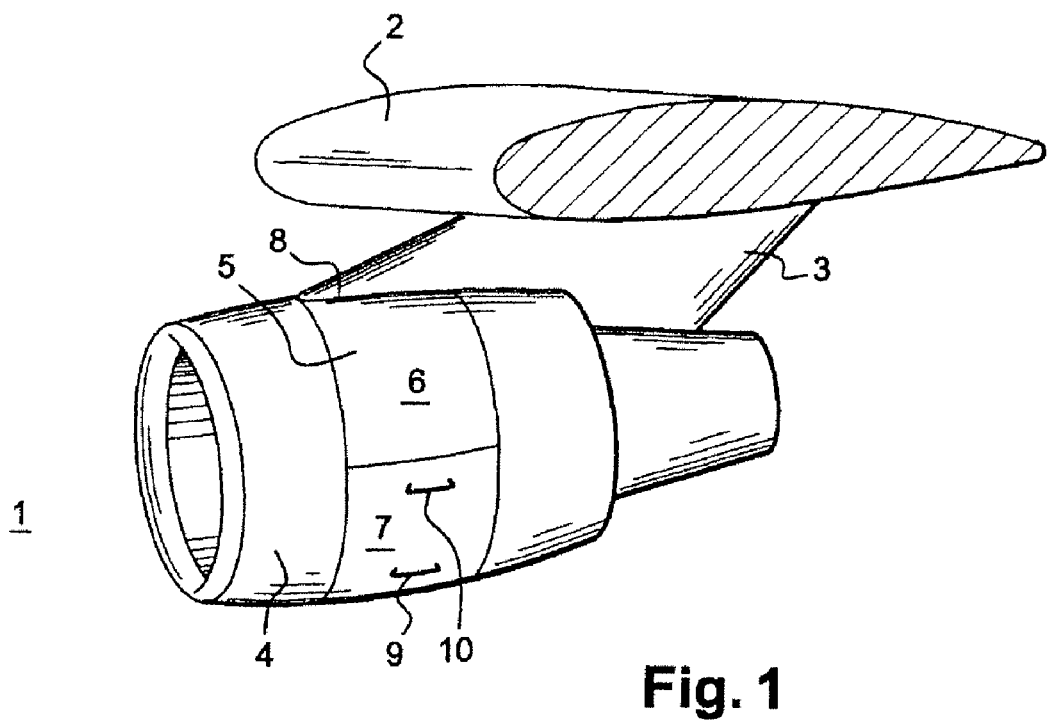
FIG. 1: a schematic depiction of a nacelle equipped with a cowling according to the disclosed embodiments.

FIG. 1 depicts a nacelle 1 attached to the wing structure 2 by an attachment pylon 3. The nacelle 1 comprises a fan casing 4 and two cowlings 5 (just one cowling is visible in FIG. 1) that respectively form the left cowling and the right cowling of the nacelle 1. Each cowling 5 has a semicircular overall shape.

The cowling 5 depicted in FIG. 1 is in the closed position. More specifically, an upper fixed part 6 and a lower moving part 7 of the cowling 5 lie one above the other so as to follow the circular or semicircular arc-shaped contour of the nacelle 1. The external surface of the cowling 5 follows an aerodynamic profile of the nacelle 1 in its entirety. An upper edge 8 of the fixed part 6 is secured to the attachment pylon 3. For example, the upper edge 8 of the fixed part 6 is screwed to the attachment pylon 3. Thus, the fixed part 6 of the cowling 5 is unable to move with respect to the remainder of the nacelle 1. Conversely, the lower moving part 7 is not secured to any fixed part of the nacelle 1 or of the attachment pylon 3.

The moving part 7 of the cowling 5 is equipped with a lower handle 9 and with an upper handle 10 that make the moving part 7 of the cowling easier to take in hand to move it from the closed position as depicted in FIG. 1 into an open position and vice versa. The lower handle 9 faces towards the ground, while the upper handle 10 faces toward the fixed part 6 of the cowling 5.

It is possible to provide for one of the two handles 9, 10, or both of them, to be retractable. Thus, in the event that the moving part 7 of the cowling 5 slides under the fixed part 6, toward the inside of the nacelle 1, the presence of the handles does not impede the sliding. In general, internal or inner means facing toward the inside of the nacelle, and external or outer means facing toward the outside of the nacelle. In addition, in flight, the retractable handles 9 and 10 do not project from the external surface of the moving part 7 of the cowling 5 as projections could disrupt the airflow over the outside of the nacelle 1.

Figure 2A:
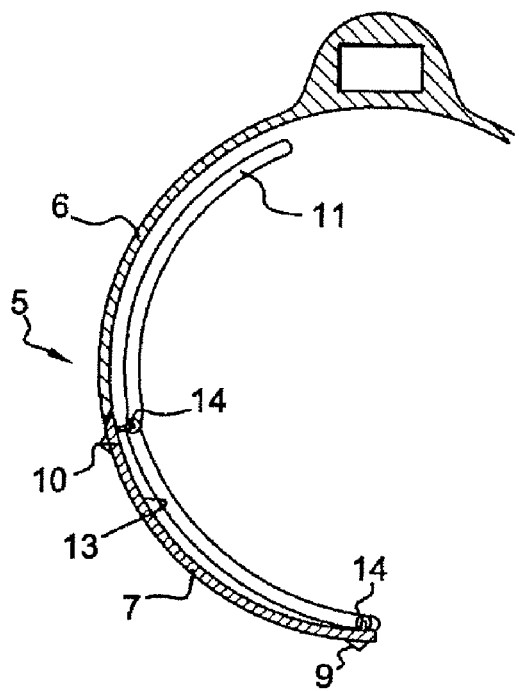
FIGS. 2A, 2B and 2C: schematic depictions of a cowling according to the disclosed embodiments and various stages of closing and opening.
Figure 2B:
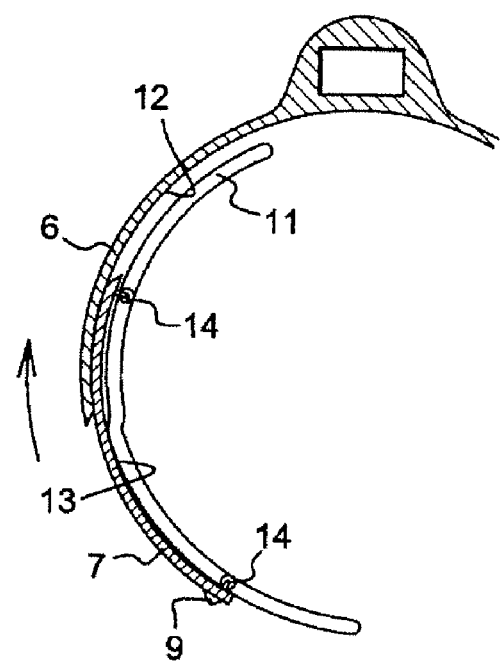
Figure 2C:
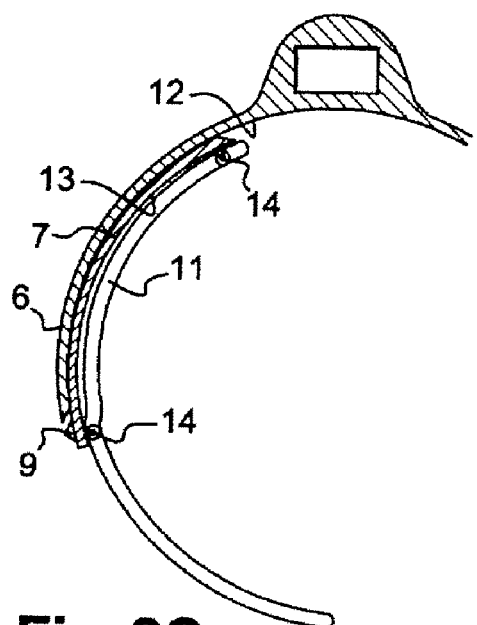

FIGS. 2A, 2B and 2C depict a partial cross section through the nacelle 1 at a cowling 5 of the disclosed embodiments, in the closed position (FIG. 2A), in the partially open position (FIG. 2B) and in the open position (FIG. 2C), respectively.

The cowling 5, in the shape of a semicircle, follows an external contour of a turbojet engine (not depicted) located inside the nacelle 1. More specifically, the fixed part 6 and the moving part 7 of the cowling 5, in the shape of an arc of a circle, respectively follow the external contour of an upper portion and of a lower portion of one side of the turbojet engine.

In the closed position, as depicted in FIG. 2A, the lower moving part 7 of the cowling 5 runs in the lower continuation of the upper fixed part 6 of the cowling 5. The fixed part 6 and the moving part 7 of the cowling 5 are formed in the height H of said cowling 5, one beneath the other.

When access is to be had to the internal volume of the nacelle, the moving part 7 of the cowling 5 is slid along the fixed part 6. In the example depicted in FIGS. 2B and 2C, the moving part 7 of the cowling 5 slides along an internal wall 12 of the fixed part 6 of said cowling 5. Thus, the moving part 7 of the cowling 5 is positioned between the fixed part 6 of the cowling 5 and the turbojet engine housed in the nacelle 1, when the cowling 5 is in the open position, as is depicted in FIG. 2C. The moving part 7 and the fixed part 6 of the cowling 5 are therefore superposed. It is then possible to access the bottom part of the turbojet, where the machinery that requires maintenance is all to be found.

When the cowling 5 of the nacelle 1 is to be opened and insofar as the moving part 7 of the cowling 5 is equipped with a lower handle 9 and with an upper handle 10, it is possible to begin to open the cowling 5 by pushing the moving part 7 of said cowling 5 upward, using the upper handle 10, then to continue to push the moving part 7 along the fixed part 6 using the handle 9 when the handle 10 becomes no longer accessible. When the moving part 7 of the cowling 5 slides under the fixed part 6, the upper handle 10 will no longer be acceptable when the portion of the moving part 7 that bears this upper handle 10 slips beneath the fixed part 6. When the moving part 7 of the cowling 5 slides over the top of the fixed part 6, the upper handle 10 will no longer be accessible when it is too high up for the user performing the turbojet maintenance to reach.

When maintenance is over, all that is required is for the moving part 7 of the cowling 5 to be pulled downward using the lower handle 9 until the cowling reaches the closed position as depicted in FIG. 2A. Of course, the phase of closing the cowling 5 may be done initially by means of the lower handle 9, then by means of the upper handle 10 when it becomes accessible to the users again, this being so that it is easier to pull the moving part 7 of the cowling 5 down.

In one particular embodiment, and as depicted in FIGS. 2A, 2B and 2C, the moving part 7 of the cowling 5 slides along the internal face 12 of the fixed part 6 of the cowling 5 via two guide rails 11 that guide the sliding. The guide rails 11 are fixably mounted inside the nacelle. For example, the bottom and top ends of the forward guide rail are secured to the casing cowling while the bottom and top ends of the rearward guide rail are secured to the thrust reverser cowling. Forward and rearward are to be understood to mean with respect to the direction of travel of an aircraft equipped with such a nacelle 1. The path of the guide rails 11 follows the arc-shaped contour of the moving 6 and fixed 7 parts of the cowling 5. Thus, the guide rails 11 are tailored to suit the desired path of the moving part 7 of the cowling 5.

The moving part 7 of the cowling 5 is equipped on an internal face 13 intended to face the guide rails 11 with two rows of engagement means 14 (just one row is visible in FIGS. 2A, 2B and 2C) capable of engaging in the guide rails 11 so as to guide the sliding of the moving part 7 of the cowling 5 along the fixed part 6 of said cowling 5. For example, the engagement means 14 are rollers arranged in pairs, one on each side of the guide rails 11. Each guide rail 11 coincides with at least two pairs of rollers 14 on the internal face 13 of the moving part 7 of said cowling 5. In the example depicted, each guide rail 11 coincides with two engagement means 14 situated in the upper and lower parts of the moving part 7 of the cowling 5 respectively. Of course, it is possible to equip the internal face 13 of the moving part 7 of the cowling 5 with three, four or more engagement means 14 per rail 11 so as to provide good guidance for the sliding of the moving part 7 along the fixed part 6 of the cowling 5. In another embodiment, sliding may be obtained by means of grooves in which linear protrusions engage, said grooves and protrusions being arranged in such a way as to coincide.

Advantageously, the internal face 13 of the moving part 7 of the cowling 5 is equipped with a locking device which, as need be, allows said moving part 7 to be kept in the lowered or raised position and therefore in the position in which the cowling 5 is closed and/or open.

Figure 3:
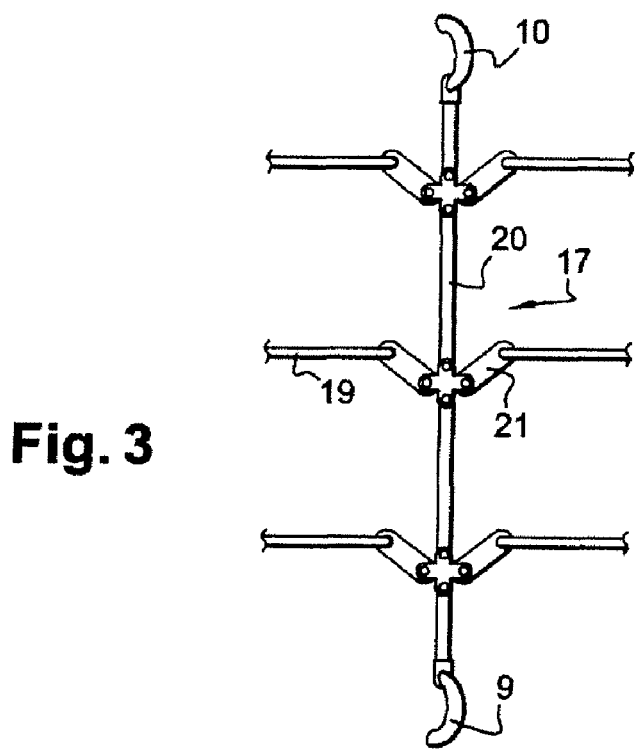
FIG. 3: a schematic depiction of one example of a system for locking a nacelle cowling according to the disclosed embodiments.

For example, the locking device may comprise a linkage system 17 as depicted in FIG. 3. The locking device according to the disclosed embodiments also comprises small orifices formed on fixed forward and rear members (not depicted) of the nacelle, these said orifices being designed to accept locking pins 19 belonging to the linkage system 17. In particular, the orifices may be made in the guide rails 11 along which the moving part 7 of the cowling 5 slides.

The linkage system 17 comprises a rod 20 positioned in the thickness of the moving part 7 of the cowling 5 and curved slightly to follow the arc-shaped contour of said moving part 7. The rod 20 extends in the height H of the moving part 7 of the cowling 5. The rod 20 is equipped with several pairs of links 21 (just three are depicted in FIG. 4) spaced uniformly along said rod 20. Each link 21 is connected, at a free end opposite to the end connected to the rod 20, to a locking pin 19. Each pair of links comprises a front link 21 and a rear link 21.

The linkage system 17 according to the disclosed embodiments allows the front pins 19 secured to the front links 21 to be engaged in orifices formed in the front guide rail 11, and the rear pins 19 secured to the rear links 21 to be engaged in similar orifices formed in the rear guide rail 11. For example, the rod 20 is situated in the middle of the moving part 7 of the cowling 5 so that the pins 19 have to be long enough to be able to reach the rails 11 in which the orifices are made. In particular, the guide rails 11 may coincide with the outer edges of the moving part 7 of the cowling 5, the pins 19 then each having to extend over half the width of said moving part 7 in order to reach the forward and rear guide rails 11 and therefore the orifices.

In the closed position, the locking device according to the disclosed embodiments allows the moving part 7 of the cowling 5 to be kept in the lower part of said cowling 5 via pins 19 inserted in the orifices situated in the bottom part of the guide rails 11. In the cowling-open position, the locking device according to the disclosed embodiments allows the moving part 7 of the cowling 5 to be kept in the raised position via the same ones 19 inserted in orifices situated in the top part of the guide rails 11.

In the example depicted in FIG. 3, the linkage system 17 of the disclosed embodiments is actuated via at least one of the two handles 9, 10 situated on the moving part 7 of the cowling 5. The handles 9 and 10 allow the linkage system 17 to be locked and unlocked. In the unlocked position, the links 21 are retracted and lie in the continuation of the rod 20, so that the pins 19 are moved aside in order not to impede the sliding of the moving part 7 of the cowling 5 along the fixed part 6. Conversely, in the locked position, the links 21 run substantially at right angles to the rod 20, the pins 19 then being deployed axially, some of them forward and the others rearward, so as to be inserted in the corresponding orifices formed in the forward and rear guides 11.

For example, when the moving part 7 of the cowling 5 is situated in the bottom part and the cowling 5 is in the closed position, it is possible to unlock the linkage system 17 using the upper handle 10, by turning said handle 10 through a quarter of a turn. The rod 20 is then pulled up, thus retracting the links 21 and corresponding pins 19. the internal pins 19 are disengaged from the orifices situated in the bottom part of the guide rails 11, allowing the moving part 7 to slide upward, along the fixed part 6 of the cowling 5. When the upper handle 10 disappears up inside the nacelle 1, the moving part 7 of the cowling 5 is lifted up along the fixed part 6 using the lower handle 9. When the moving part 7 of the cowling 5 reaches the desired position with respect to the fixed part 6 of said cowling 5, the linkage system 17 is locked again by turning the lower handle 9 through a quarter of a turn so as to pull the rod 20 towards said lower handle 9, thus deploying the links 21 and the pins 19 toward the orifices formed for this purpose in the upper part of the forward and rear guide rails 11.

When the cowling 5 is to be closed again, all that is required is for the lower handle 9 to be turned through one quarter of a turn in the opposite direction so as to push the rod 20 upward and thus retract the links 21 and pins 19. The moving part 7 of the cowling 5 therefore regains its mobility. The moving part 7 of the cowling 5 can then be pulled down using the lower handle 9 and then the upper handle 10 when the latter comes clear from underneath the fixed part 6 of the cowling 5.

In order to lock the moving part 7 of the cowling 5 in the closed position, the upper handle 10 is turned through a quarter of turn so as once again to deploy the links 21 and the pins 19 of the linkage system 20.

In the examples depicted in FIGS. 1 and 2, the dimensions of the moving part 7 of the cowling 5 are substantially equal to the dimensions of the fixed part 6 of said cowling 5. It is equally possible to provide a moving part 7 the dimensions of which are strictly smaller than the dimensions of the fixed part 6 of the cowling 5. For example, the moving part 7 of the cowling 5 has a height strictly smaller than the height of the fixed part 6. Likewise, it is possible for the length of the moving part 7 of the cowling 5 to be shorter than the length of the fixed part 6.

The invention claimed is:

1. A nacelle cowling for a turbojet, wherein it is equipped with a fixed part and a moving part extending one above the other, the moving part being able to slide along the fixed part from a closed position in which the moving part runs in the continuation of the fixed part to an open position in which the moving part is at least partially superposed on the fixed part, wherein the fixed part lies in the upper part of the cowling, the moving part lying in the lower part of the cowling, and wherein the moving part comprises engagement means capable of engaging in guide rails that guide the sliding, it being possible for the guide rails to be fixably mounted in the nacelle.

2. The nacelle cowling as claimed in claim 1, wherein the moving part of the cowling slides along an internal face of the fixed part of the cowling.

3. The nacelle cowling as claimed in claim 1, wherein the moving part is equipped with at least one upper handle situated at the upper part of the moving part and with at least one lower handle situated in the lower part of the moving part.

4. The nacelle cowling as claimed in claim 3, wherein at least one upper and/or lower handle is retractable.

5. The nacelle cowling as claimed in claim 1, wherein it comprises a locking device capable of locking the moving part of the cowling in the closed and/or open position.

6. The nacelle cowling as claimed in claim 5, wherein the locking device comprises pins situated on an internal face of the moving part of the cowling, the pins being intended to be inserted in orifices made on fixed members of the nacelle.

7. The nacelle cowling as claimed in claims 5, wherein the locking device is actuated by at least one handle situated on the moving part of the cowling.

8. A turbojet nacelle equipped with at least one cowling as claimed in claim 1.

* * * * *